UNITED STATES PATENT OFFICE 2,645,069

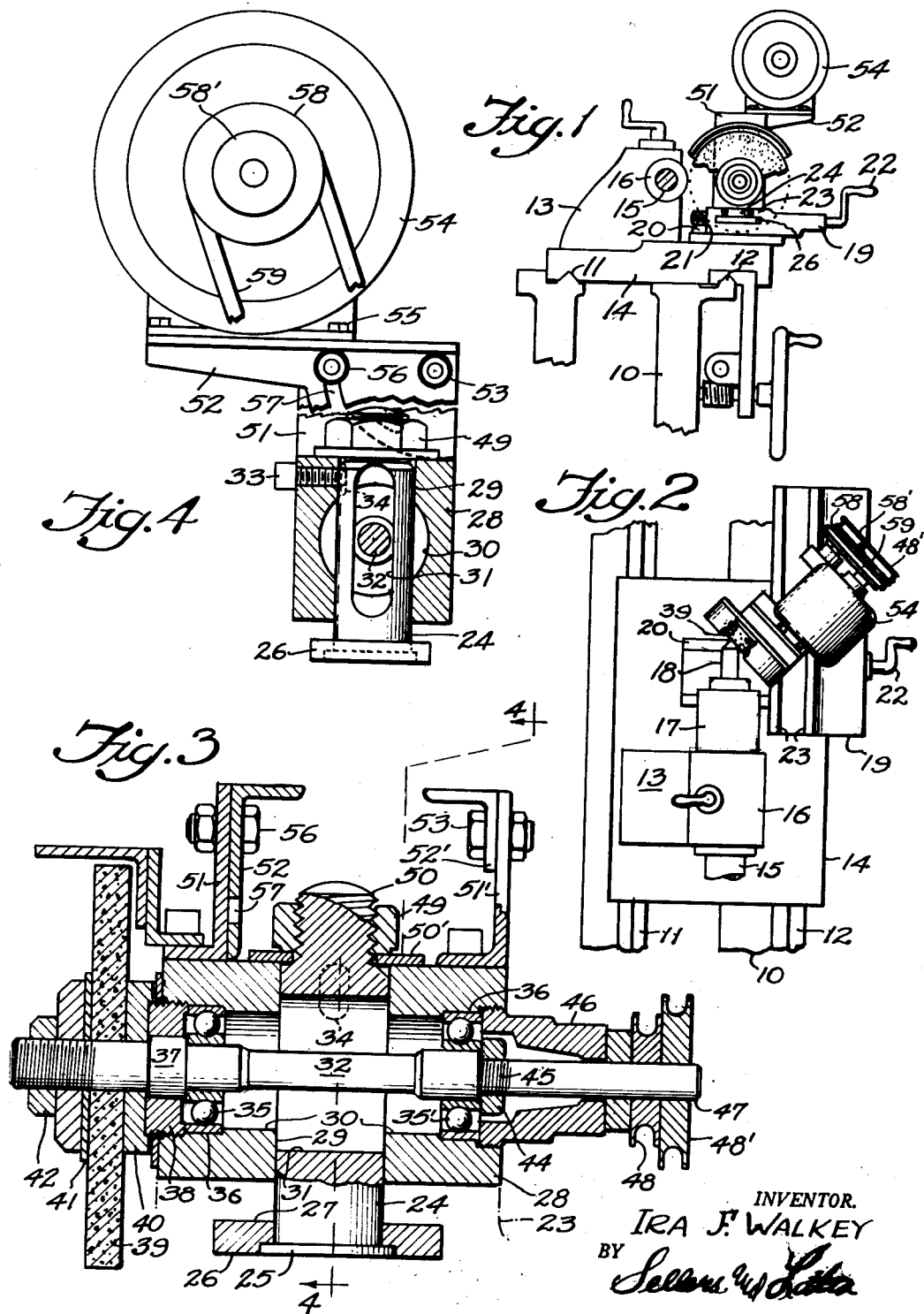

GRINDING ATTACHMENT FOR LATHES

Ira F. Walkey, Van Nuys, Calif.

Application September 11, 1951, Serial No. 246,020

2 Claims. (Cl. 51—260)

This invention relates to motor driven arbors and has as its general object to provide an arbor and motor assembly having means for readily attaching the same to a machinist's lathe and for adjusting the same with reference to the work holder of the lathe, so as to provide for the performance of operations such as grinding, milling, machining etc., upon work mounted in such work holder. The invention is particularly adaptable to the grinding of accurate finished surfaces upon automatic lathe products such as arbors and lathe tail stocks, and one of the primary objects of the invention is to provide a grinding arbor having means for mounting the same on a machinist's lathe, and for adjustment of the grinding wheel to a position for grinding the conical point of a tail stock which is held in the driven chuck of a lathe and is rotated slowly during the grinding operation so as to generate the conical surface.

One of the important objects of the invention is to provide a motor driven arbor having means for mounting the same for rotatable adjustment about a vertical axis, so as to adapt the same to the grinding of either conical or cylindrical surfaces on a piece of work held by the work holder of the lathe. A further object is to provide such an arbor unit, which is of relatively simple and inexpensive construction. A further object is to provide such an arbor unit in which the means for mounting the same on the lathe is designed to coact with the ways of a conventional transversely shiftable tool holding carriage of the lathe mechanism, and to cooperate with such ways in securing the arbor of the invention in various positions of angular adjustment relative to the axis of the lathe work holder.

Other objects will become apparent in the ensuing detailed description, taken in connection with the appended drawings, in which:

Fig. 1 is an end view of a conventional machinist's lathe having my improved arbor unit attached thereto.

Fig. 2 is a plan view of the same, with the axis of the arbor disposed at an angle of inclination such as to grind a conical point on a lathe tail stock held by the work holder of the lathe;

Fig. 3 is a detail axial sectional view of the arbor unit; and

Fig. 4 is a transverse sectional view of the same taken on the line 4—4 of Fig. 3.

Referring now to the drawing in detail, I have shown in Fig. 1 a machinist's lathe embodying a base structure 10 having at the top thereof a pair of longitudinally extending ways 11, 12; a drive shaft bracket 13 having a base portion 14 slideably mounted upon the ways 11, 12, a drive shaft 15 rotatably mounted in a bearing 16 forming part of said bracket 13, and a work holder chuck 17 carried by one end of said drive shaft 15. A work piece 18, which may constitute the lathe tail stock to be fabricated in the lathe, is shown mounted in the work holder 17 and adapted to be rotated thereby.

The lathe also includes a conventional transversely adjustable tool holder carriage 19 which is mounted upon spaced transverse ways 20 forming part of the base section 14 of bracket 13. The cross carriage unit includes a conventional feed screw 21 cooperating with a follower nut (not disclosed) on the underside of carriage 19, and actuated by a crank 22, for shifting carriage 19 along ways 20, transversely of the axis of work holder 17. Since all of these parts are conventional, details thereof have not been illustrated.

The carriage 19 is provided with conventional longitudinal ways 23, in which there is ordinarily mounted a tool holder bracket. Preparatory to attachment of the arbor mounting of my invention, this tool holder bracket is removed, in order that the invention may utilize the ways 23 for the mounting of a vertical post 24, by means of which the arbor unit is attached to carriage 19. The lower end portion of post 24 extends between ways 23 and has an integral, radially extending flange 25 by means of which it is rotatably connected to a head 26 having an upper face 27 for engaging the under faces of ways 23. Post 24 extends through a circular opening in head 26, in which it is journalled for rotative adjustment of the post relative to the head 26 and to ways 23.

A bearing holder 28 is mounted upon post 24, the post projecting upwardly through a central vertical bore 29 therein. Holder 28 has a longitudinal bore 30 in two sections, interrupted by the bore 29. Post 24 has a transverse aperture therein, in the form of a vertically extending elongated slot 31 the axis of which coincides with the axis of bore 30. Slot 31 accommodates the central portion of an arbor 32 which extends centrally through post 24 and through bore 30. The vertical elongation of slot 31 allows some vertical adjustment of holder 28 relative to post 24. Holder 28 is secured against rotation about post 24 by a keyed or splined connection which, however, allows limited vertical movement of holder 28 relative to the post. Such keyed connection may be comprised in a set screw 33 threaded through the side of holder 28 and engaged in a key way 34 extending vertically in one side of post 24, in a plane at right angles to that of slot 31. This keying of the post 24 to the holder 28 maintains the centered relation of shaft 32 in slot 31, preventing any bearing engagement between the shaft and the walls of the slot 31 as the result of adjustment of holder 28 rotatably about the axis of post 24. That is to say, the post and holder are adjusted as a unit about the axis of the post, in order to shift the axis of arbor 32 with reference to that of work holder 17.

Arbor 32 is mounted in anti-friction bearings 35, 35' the outer races of which are received in counterbores 36 in the outer ends of horizontal bore 30. The inner race of bearing 35 is positioned against a shoulder defined at the inner end of an enlarged portion 37 of arbor 32. A collar 38, threaded into the adjacent counterbore 36, secures the outer race of bearing 35. A grinding wheel 39 is secured between washers 40 and 41, the former being positioned against the forward shoulder of enlarged portion 37 and the latter being engaged by a nut 42 which is threaded onto a threaded end portion 43 of arbor 32. Bearing 35' has its inner race positioned against a nut 44 which is threaded onto an intermediate threaded portion 45 of arbor 32. The outer race of bearing 35' is secured by a collar 46 one end of which is threaded into the adjacent counterbore 36. Arbor 32 has a reduced end portion 47 which extends through collar 46 and has secured to its projecting portion a pair of drive pulleys 48, 48'.

Holder 28 is substantially square in cross section as indicated in Fig. 4. Its under face is adapted to be clamped against the upper faces of ways 23 by a clamping nut 49 which is threaded onto a threaded upper end portion 50 of post 24. A washer 50' is interposed between nuts 49 and the upper face of holder 28. Secured to its upper face are a pair of angle iron brackets 51, 51' which in turn carry a pair of arms 52, 52', of angle iron sections. Vertical legs of arms 52, 52' are pivotally connected to the upright members of brackets 51, 51' by pivot bolts 53. Arms 52, 52' cooperatively support an electric motor 54, the base of which is secured to the horizontal legs of arms 52, 52' by screws 55. Arms 52, 52' may be tilted about the common axis of the bolts 53, and may be secured in any position of tilted adjustment by means of a bolt 56 which extends through an opening in the vertical leg of bracket 51 and through an arcuate slot 57 in the vertical leg of arm 52. Slot 57 is concentric to the axis of pivots 53. Upon the shaft of motor 54 are secured a pair of drive pulleys 58, 58', disposed in common planes with respective pulleys 48, 48'. A belt 59 connects one of the pulleys 58, 58' to a corresponding pulley 48, 48'.

By loosening clamping nut 49, it becomes possible to rotate holder 28, post 24, and the parts carried thereby, about the vertical axis of post 24, thereby to dispose the grinding face of grinding wheel 39 at any desired angle with reference to the axis of chuck 17 as, for example, at an approximately 45° angle as indicated in Fig. 2, for grinding the conical point 60 of work 18, or at right angles to the axis of chuck 17, for grinding a cylindrical lateral surface of the work. The latter position is indicated in Fig. 1.

Crank 22 may be actuated for moving carriage 19 transversely, thereby to move the arbor unit closer to or farther away from the axis of chuck 17, as desired.

I claim:
1. In a grinding attachment for a lathe having transverse ways, a carriage slideably mounted on said ways, a rotatable work holder, and means for shifting said carriage transversely with reference to the axis of said work holder, the combination of: a single integral cylindrical post having a lower end extending into said carriage and provided with a head to engage said carriage; a bearing holder having a centrally disposed cylindrical vertical bore through which said post extends, and having a horizontal bore in two sections interrupted by said post, said post having a transverse aperture establishing communication between said bore sections, said bearing holder having a lower face bearing against said carriage and cooperating with said head to provide a pair of clamping jaws for clamping engagement of said carriage to secure said post and holder in fixed attachment to said carriage, said post and holder being rotatably adjustable relative to said carriage when such clamping engagement is relaxed; a tool arbor extending through said horizontal bore and through said aperture; bearing means mounted in the respective horizontal bore sections, in which bearing means said arbor is journalled; a motor mounted on said bearing holder; drive means connecting said motor and one end of said arbor; means on the other end of said arbor for securing a tool thereto and clamping means including a nut threaded on the upper end of said post, said clamping means engaging the top of said bearing holder and functioning to draw said jaws into clamping engagement with said carriage for fixing said holder in a selected position of angular adjustment of the axis of said arbor relative to that of said work holder.

2. In a lathe having transverse ways, a carriage slideably mounted on said ways, a rotatable work holder, and means for shifting said carriage transversely with reference to the axis of said work holder, said carriage having spaced ways extending parallel to the axis of said work holder, a single, integral, cylindrical post having its lower end extending between said ways and having a head rotatably attached to said lower end and engageable with under faces of said carriage beneath said ways; a bearing holder having a centrally disposed cylindrical vertical bore through which said post extends, and having a horizontal bore in two sections interrupted by said post, said post having a transverse aperture establishing communication between said bore sections, said bearing holder having a lower face bearing against said carriage and cooperating with said head to provide a pair of clamping jaws for clamping engagement of said ways to secure said post and holder in fixed attachment to said carriage, said post holder being rotatably adjustable relative to said carriage when such clamping engagement is relaxed; a grinding wheel arbor extending through said horizontal bore and through said aperture; bearing means mounted in the respective horizontal bore sections, in which said arbor is journalled; a motor mounted on said bearing holder; drive means connecting said motor and one end of said arbor; means on the other end of said arbor for securing a grinding wheel thereon; and clamping means including a nut threaded on the upper end of said post, said clamping means engaging the top of said bearing holder and functioning to draw said jaws into clamping engagement with said carriage for fixing said holder in a selected position of angular adjustment of the axis of said arbor relative to that of said work holder.

IRA F. WALKEY.

References Cited in the file of this patent

UNITED STATES PATENTS

| Number | Name | Date |
|---|---|---|
| 1,057,005 | Miles | Mar. 25, 1913 |
| 1,559,245 | Gilbert | Oct. 27, 1925 |
| 1,719,689 | Buehrle | July 2, 1929 |
| 1,859,068 | Beach | May 17, 1932 |
| 2,562,661 | Fisher | July 31, 1951 |

FOREIGN PATENTS

| Number | Country | Date |
|---|---|---|
| 197,931 | Switzerland | Aug. 16, 1938 |